J. C. FERGUSON.
PLOW.
No. 195,811. Patented Oct. 2, 1877.
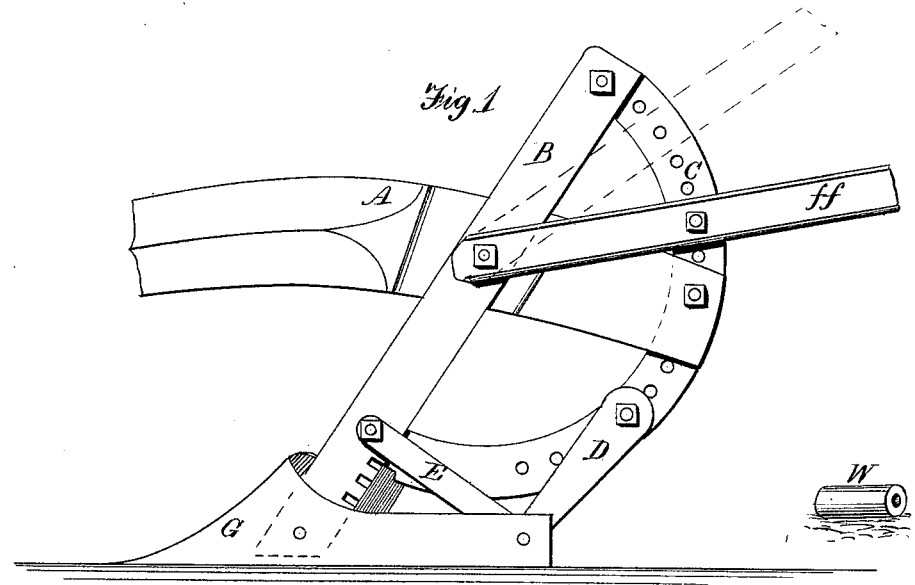
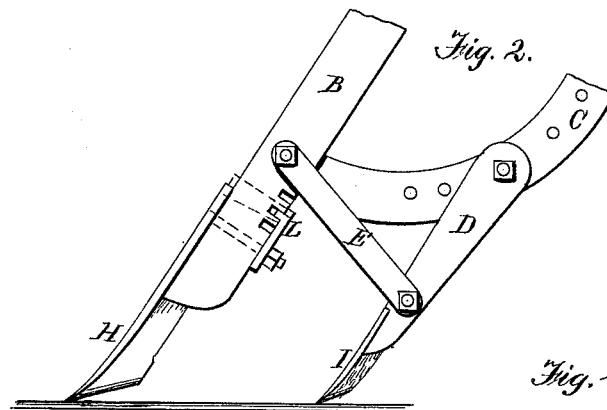
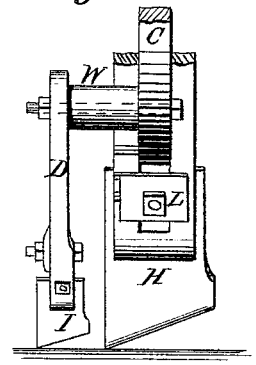
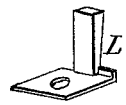
Witnesses
Grenville Lewis
P. McKenny
Inventor
James C. Ferguson.
By Thos. C. Fullerton
attorney

UNITED STATES PATENT OFFICE.

JAMES C. FERGUSON, OF CROSS PLAINS, ALABAMA.

IMPROVEMENT IN PLOWS.

Specification forming part of Letters Patent No. 195,811, dated October 2, 1877; application filed January 31, 1877.

*To all whom it may concern:*

Be it known that I, JAMES C. FERGUSON, of Cross Plains, in the county of Calhoun and State of Alabama, have invented certain new and useful Improvements in Plows; and I do hereby declare that the following is a full, clear, and exact description thereof, which will enable others skilled in the art to which it appertains to make and use the same, reference being had to the accompanying drawings, and to letters of reference marked thereon, which form a part of this specification, in which—

Figure 1 is a land-side view of my plow without the subsoil attachment. Fig. 2 is a view of the same side in reduced size, and showing how the subsoil attachment is adjusted to work in conjunction with and following the cultivator or turning plow in front. Fig. 3 is a rear view, showing how my plow may be used as a double-footed plow by removing the subsoil-foot to the left side by means of the whirl attached as shown. Fig. 4 is the lug and plate, by means of which and a screw-bolt and nut the share is attached to the plow-foot, as shown, so as to prevent its turning.

The same letters are employed in all the figures for the designation of identical parts.

In the annexed drawings, A is the beam. B is the foot. C is the segment. D is the subfoot. E is the link. W is the whirl, to be attached when a double-footed plow is desired. $ff$ are the handles, and G, H, and I are three different forms of shares, suitable for use either separately or any two of them in conjunction, as shown in the drawings.

The advantages claimed for this plow are, first, that it can be set to cut a deep or shallow furrow, as desired, by raising or lowering the rear end of the beam upon the segment C; second, the handles can be raised or lowered to suit the height or convenience of any person without changing any other part of the plow; third, the subsoiler may be used behind and in connection with any other form of share, as shown in Fig. 2; fourth, that it can be used as a double-footed plow by attaching two shares of suitable size, removing the hinder one to the left by means of the whirl W, as shown in Fig. 3; fifth, the segment C forms a strong brace, holding the handles, standard, and beam firmly together; sixth, the slot in the foot will allow a play of four inches for adjusting the share higher or lower, so that the share can be used till it is worn out.

What I claim as my invention, and desire to secure by Letters Patent, is—

The combination, in a plow, of the beam A, standard B, the adjusting segment and brace C, placed vertically in the rear of the standard, the handles $ff$, standard D, and brace E, constructed as described and shown, and adapted to secure a land-side plow or a shovel-plow and subsoiler, as set forth.

In testimony that I claim the foregoing as my own invention I affix my signature in presence of two witnesses.

J. C. FERGUSON.

Witnesses:
 THOMAS STEWART,
 J. F. COWDEN.